United States Patent [19]

Stolarczyk

[11] Patent Number: 4,912,589
[45] Date of Patent: Mar. 27, 1990

[54] SURGE SUPPRESSION ON AC POWER LINES

[75] Inventor: Daniel W. Stolarczyk, Ronkonkoma, N.Y.

[73] Assignee: TII Industries, Inc., Copiague, N.Y.

[21] Appl. No.: 143,548

[22] Filed: Jan. 13, 1988

[51] Int. Cl.$^4$ .............................................. H02H 9/06
[52] U.S. Cl. ........................................ 361/56; 361/91; 361/120; 361/127; 337/28
[58] Field of Search ................... 361/54, 56, 58, 91, 361/110, 111, 120, 117, 126–130; 337/28, 29

[56] References Cited

U.S. PATENT DOCUMENTS

| | | | |
|---|---|---|---|
| 3,600,634 | 8/1971 | Muench, Jr. | |
| 3,968,407 | 7/1976 | Wilson. | |
| 4,023,071 | 5/1977 | Fussell | 361/120 X |
| 4,288,830 | 9/1981 | Brasfield | 361/56 |
| 4,321,644 | 3/1982 | Brasfield | 361/56 |
| 4,466,039 | 8/1984 | Moran et al. | 361/35 |
| 4,563,720 | 1/1986 | Clark | 361/91 X |
| 4,571,656 | 2/1986 | Ruckman | 361/56 |
| 4,587,588 | 5/1986 | Goldstein | 361/54 |
| 4,628,398 | 12/1986 | Cook | 361/120 |
| 4,631,621 | 12/1986 | Howell | 361/56 X |
| 4,695,916 | 9/1987 | Satoh et al. | 361/56 X |

FOREIGN PATENT DOCUMENTS 1412158 10/1975 United Kingdom .............. 361/91

Primary Examiner—Todd E. DeBoer
Attorney, Agent, or Firm—Pennie & Edmonds

[57] ABSTRACT

A triggered surge suppression network is disclosed comprising a low voltage clamping device, a crowbar device and a trigger device. The voltage clamping device and the trigger device are connected in parallel; and these devices are connected in series to the crowbar device. The resulting circuit is connected across a voltage supply, in parallel to a load. The trigger device causes the crowbar device to break down at a pre-set value and discharge the energy of the surge through the low voltage clamping device. The breakdown voltage of the network will depend essentially on the breakdown voltage of the crowbar device while the peak voltage supplied to the load during the surge will independently be determined by the clamping voltage of the voltage clamping device.

18 Claims, 5 Drawing Sheets

SURGE SUPPRESSION ON AC POWER LINES

BACKGROUND OF THE INVENTION

This invention relates generally to voltage protection and more particularly to a triggered voltage suppression network which provides a low voltage, clamp of transient surges, the clamping voltage level thereof determined by a clamping device, and a breakdown voltage level at which the network first reacts to a transient independently determined by a crowbar device.

A wide variety of electrical devices exist which are susceptible to damage from voltage sources having transient surges. Transient surges generally arise from a number of sources such as lightning strikes, inductive machines and switching and powering of electrical equipment. Unfortunately, such transient surges are often unpredictable and utility companies cannot adequately guard against hem especially when they are localized as is the case of a transient produced by a neighbor's switching on a motor. To further complicate matters, most electrical equipment in use today has inadequate surge suppression incorporated therein.

Devices and circuit configurations which afford some degree of voltage protection against transients on AC lines are known in the art. Illustrative of such are voltage clamping devices and crowbar devices. However, there are disadvantages associated with each of these which render them less than adequate in many applications.

Known voltage clamping devices such as varistors clamp a supply voltage to a specific voltage level upon an increase in current and/or voltage through/across the clamping device beyond a specific amount. An increase in supply current generally accompanies an increase in supply voltage, and vice versa. The specific voltage level to which the supply voltages is initially clamped is known as the clamping voltage. However, as the current through the clamping device is further increased, the voltage across the (clamping device increases beyond the initially clamped voltage, although at a much lower rate. Unfortunately, if the voltage source impedance is relatively low, the clamping device will be less effective due to its own dynamic impedance and the device may not be able to adequately suppress the transient. A most significant disadvantage of known clamping devices arises due to the practical requirement that their clamping voltage be set substantially higher than the anticipated maximum peak line voltage in order to provide a reasonable margin of safety. By way of illustration, the breakdown voltage associated with known clamping devices used on 120 VAC line is typically 250 VDC at 1mA. During sure this voltage will increase proportionally to the current that the transient is delivering. A voltage of 500VDC and more may be reached on a 8/20 us, 3000A waveform, resulting in a stress to the equipment that is being protected.

Known crowbar devices such as gas tubes and thyristors and the like involve a switching action such as that associated with the breakown of a gas between electrodes in a gas tube, or the turning on of a thyristor. Unlike clamping devices, once crowbar devices are activated, they enter a very low impedance state which diverts transients from the parallel connected load. Unfortunately, such crowbar devices suffer from hysteresis. More specifically, although activated at a transient voltage in excess of the supply voltage, crowbar devices are not deactivated until the voltage drops to a level sufficiently far below the supply voltage. In other words, where power from a steady-state voltage source follows a transient surge discharge, such "follow-current" is often too high to turn the crowbar device off. Furthermore, crowbar devices have a tendency of not recovering even after zero-voltage crossing. An additional disadvantage of crowbar devices lies in their low impedance state when activated. Although it is desired to protect equipment connected to a 120VAC supply from transients, it is preferable to provide a voltage as near as possible to 120VAC during the disturbance and not to crowbar the supply voltage towards zero volts, thus effectively disconnecting the load equipment from the power supply.

A transient surge suppression network whose breakdown voltage level may be chosen independently of its clamping voltage, and whose clamping voltage may be chosen near to the anticipated peak supply voltage, is thus clearly desirable.

SUMMARY OF THE INVENTION

The present invention is directed to a surge suppression network comprising a solid state voltage clamping device a crowbar device, and a device.

In the presently preferred embodiment, the trigger device is connected in parallel with the clamping device. These devices are connected in series with the crowbar device, and the resulting circuit is connected across the voltage supply, in parallel to a load. The trigger device is utilized during a transient to permit the voltage across the crowbar device to rise almost at its initial rate of rise at the input terminals of the network until the breakdown voltage of the crowbar device is reached. Once the breakdown voltage is reached, most of the voltage across the input terminals of the network will appear across the voltage clamp and not the serially connected crowbar device which has a low impedance when activated. As a result, triggering of the crowbar device causes the voltage clamp to be activated.

Such a configuration of the network allows for independent selection of the breakdown voltage, i.e., the voltage at which the network will respond to a transient, and the clamp voltage, i.e., the voltage to which the network will limit the supply voltage when a transient is encountered. Breakdown voltage may be chosen in accordance with the rating of the crowbar device and/or trigger device in order to provide adequate headroom over the input line supply voltage. Clamp voltage may then be chosen in accordance with the maximum expected surge current in order to maintain line voltage at the desired level (e.g., 120 VAC) during the disturbance.

Such a scheme advantageously allows the use of a voltage clamping device with a clamp voltage at or below the supply voltage, since the breakdown voltage of the crowbar device now provides the safety margin that could otherwise have been supplied by a relatively high clamping voltage. Furthermore, the crowbar device will still recover once the surge diminishes.

Accordingly, it is a principal object of the present invention to provide new and improved voltage protection.

An additional object is to provide a triggered surge suppression network wherein the clamp voltage is minimized.

A further object is to provide a triggered surge suppression network which offers an increased level of safety for protected equipment.

A still further object is to provide a triggered surge suppression network which clamps the voltage available to a load during a voltage surge.

A further object is to provide a triggered surge suppression network which protects from follow current after a transient.

Another object is to provide a triggered surge suppression network which does not utilize a significant amount of power during normal operation.

BRIEF DESCRIPTION OF THE DRAWINGS

These and other objects, features and advantages of the invention will become more readily apparent with reference to the following description of the invention in which.

DETAILED DESCRIPTION OF THE INVENTION

Figure 1:
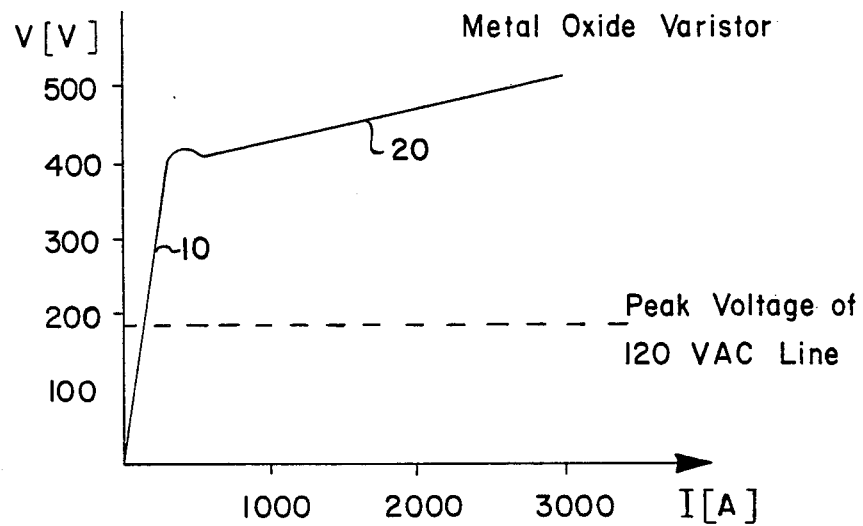
FIG. 1 illustrates the voltage-current characteristics voltage clamping device.

Referring to FIG. 1, there is illustrated the voltage-current characteristics of a known voltage clamping device, and more specifically, of a Metal Oxide Varistor (MOV) of the type known in the art as V150LA20B used on a 120 VAC supply line. The clamping voltage of this illustrative clamping device is sen to be approximately 400V. As will be appreciated, a varistor is a voltage dependent resistor. The MOV depicted in FIG. 1 has associated therewith a first resistance defined by the slope of line 10 and a second resistance defined by the slope of line 20. The actual resistance as well as the actual clamped voltage of the MOV will of course depend on whether the MOV is operating within the range of current and voltage associated with line 10 or within the range of current and voltage associated with line 20.

Figure 2:
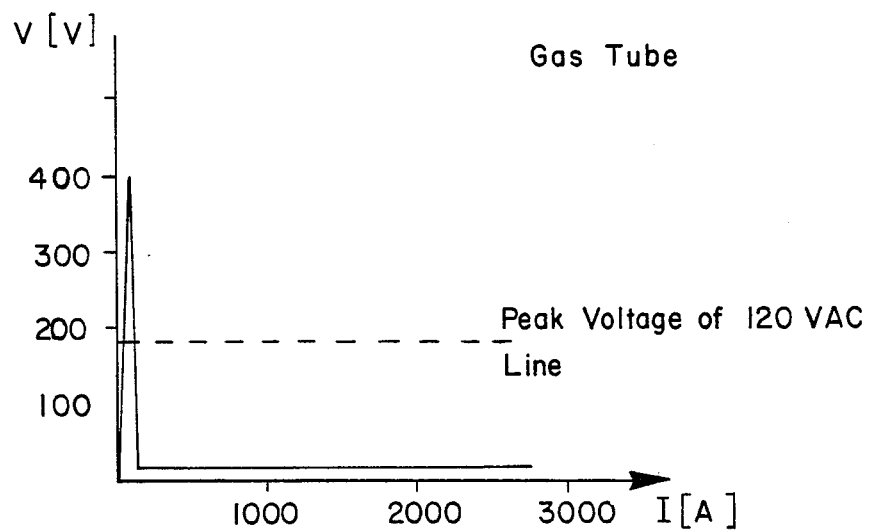
FIG. 2 illustrates the voltage-current characteristics of a known crowbar device.

Referring to FIG. 2, there is illustrated the voltage-current characteristics of a known crowbar device, and more specifically, of a gas tube used on a 120 VAC voltage supply line. The breakdown voltage of this illustrative crowbar device is seen to be approximately 400V, while the arc voltage is approximately 10V. The arc voltage is the voltage drop across the gas tube during activation. The current through the gas tube remains close to zero as the voltage across the gas tube approaches its breakdown voltage. Once the breakdown voltage is reached, an arc is generated between electrodes of the gas tube, thus approximately shorting the tube, reducing the voltage across the tube to approximately 10 volts, and greatly increasing the current.

Figure 3:
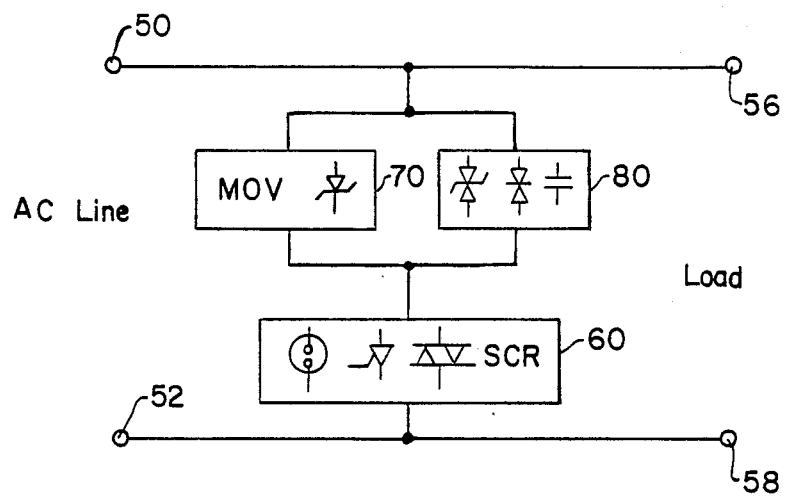
FIG. 3 in schematic form, a preferred embodiment of the present invention having a trigger device, a clamping device and a crowbar device.

Referring now to FIG. 3, there is depicted, in schematic form, a preferred embodiment of the present invention comprising input terminals 50, 52, output terminals 56, 58, crowbar device 60, voltage clamping device 70, and trigger device 80.

Input terminals 50, 52 are coupled to an AC voltage supply (not shown) which supplies voltage to a load (not shown) connected across output terminals 56, 58.

Crowbar device 60 generally provides a high impedance pat for current to flow. However, once the breakdown voltage of crowbar device 60 is reached, it will provide a low impedance path. Crowbar device 60 may take on a variety of forms, such as a gas tube, thyristor, bidirectional triode-thyristor(triac), silicon controlled rectifier (SCR) or the like. Furthermore, crowbar device may comprise two, three or more electrodes for protection of a corresponding plurality of paths.

Voltage clamping device 70 generally clamps a voltage supplied across it to a specific voltage level upon an increase in current through it beyond a specific amount, such increase in current generally accompanying an increase in supply voltage. Clamping device 70 may take on a variety of forms, such as a Metal Oxide Varistor (MOV), or high power zener diode or the like.

Trigger device 80 is connected in parallel to clamping device 70. These devices are connected in series with crowbar device 60. The resulting circuit is connected across the input terminals 50, 52, in parallel with the load. Trigger device 80 generally triggers or activates crowbar device 60 upon detection of a transient. Trigger device 80 may take on a variety of forms, such as a capacitor, bidirectional low power zener diode or the like. Trigger device 80 advantageously permits the crowbar device to react at its own breakdown voltage, rather than the sum of the breakdown voltage of crowbar device 60 and the clamping voltage of clamping device 70, as would be the case if trigger device 80 were removed from the circuit.

In the practice of the invention depicted in FIG. 3, a transient surge from the voltage supply will be provided to input terminals 50, 52. Trigger device 80, illustratively a capacitor, will allow the voltage to rise across crowbar device 60 at almost the initial rate at which the transient is supplied to the input terminals. This voltage across crowbar device 60 will rise until it reaches the breakdown voltage of the crowbar device.

Once the breakdown voltage of the crowbar device is reached, the crowbar device enters a low impedance state and permits an increased current flow, at which time clamping device 70 is activated. Clamping device 70 then clamps the supply voltage to the sum of the clamping voltage of the clamping device and tee relatively small steady state voltage across the crowbar device during activation. Such steady state voltage, in the case of a gas tube, is referred to as the arc voltage and may be on the order of 10 volts for a 120VAC supply.

Since the clamping device is activated or engaged by the crowbar device only during occurrence of the transient surge, and then disengaged, the value of the clamp voltage may be chosen much lower than in conventional circuits. The breakdown voltage of the entire network will generally depend on the breakdown voltage of the crowbar device while peak voltage during the transient surge will be determined by the low voltage clamping device (except for the arc voltage).

Such a network configuration advantageously allows the use of a voltage clamping device with a low clamping voltage below even the AC peak voltage. The transcrowbar device as well as the clamping device will both recover once the transient surge diminishes. More specifically, once the AC peak voltage falls below the sum of the clamping voltage of the clamping device and the arc voltage of the crowbar device, the clamping device will enter a higher impedance state and recover. Once the clamping device recovers, there will be insufficient current available to the crowbar device to maintain its low impedance state and thereby it will also recover.

Figure 4:
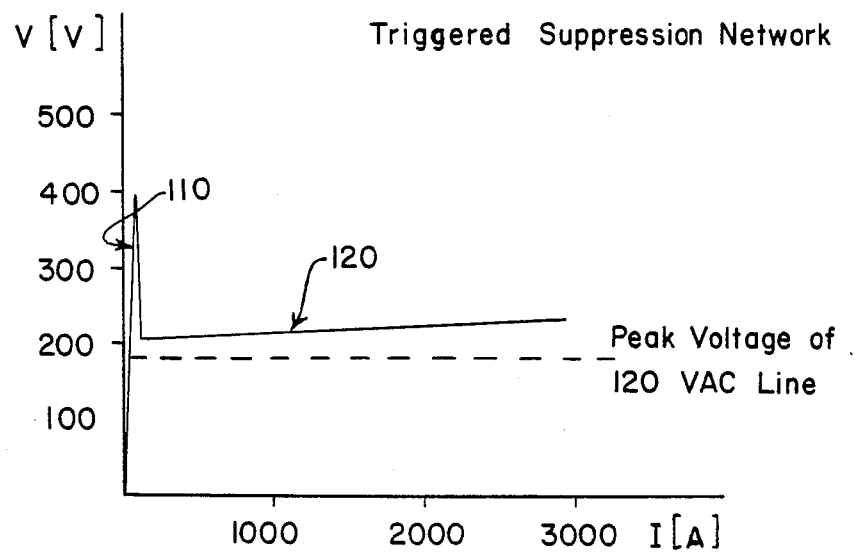
FIG. 4 illustrates the voltage-current characteristics of the presently preferred embodiment depicted in FIG. 3.

FIG. 4 illustrates the voltage-current characteristics of the presently preferred embodiment depicted in FIG. 3 for use on a 120VAC voltage supply. As is apparent, a transient 110 of approximately 400V will trigger the network, causing the crowbar device to enter a low impedance state and thus turn on the clamping device. The clamping device then clamps the supply to a level initially of approximately 200V as indicated by line 120.

Figure 5:
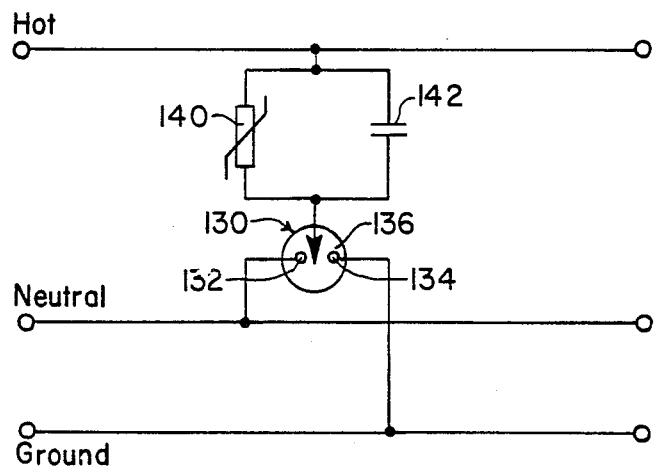
FIG. 5 depicts, in schematic form, an embodiment of the present invention utilizing a crowbar device in the form of a three-electrode gas tube.

FIG. 5 depicts an embodiment of the present invention utilizing a crowbar device in the form of a three-electrode gas tube 130. Three-electrode gas tube 130 comprises a first electrode 132 connected to a neutral line of the power supply, a second electrode 134 connected to a ground line and a third electrode 136 connected to the parallel combination of clamping device 140 and trigger device 142. Clamping device 140 illustratively is a MOV with a clamping voltage of 150VDC at 1 mA, while trigger device 142 illustratively is a 0.1 µF, 630V capacitor.

The device depicted in FIG. 5 operates in a manner similar to the device of FIGS. 3, 4. However, three-electrode gas tube 130 provides for symmetrical protection of the hot-to-neutral path, as well as of the hot-to-ground path. In other words, if either the hot-to-neutral voltage or the hot-to-ground voltage exceeds the breakdown voltage of the network, gas tube 130 will enter a low impedance state and together with clamping device 140 will clamp the hot-to-neutral voltage as well as the hot-to-ground voltage to a specific level determined essentially by clamping device 140.

Figure 6:
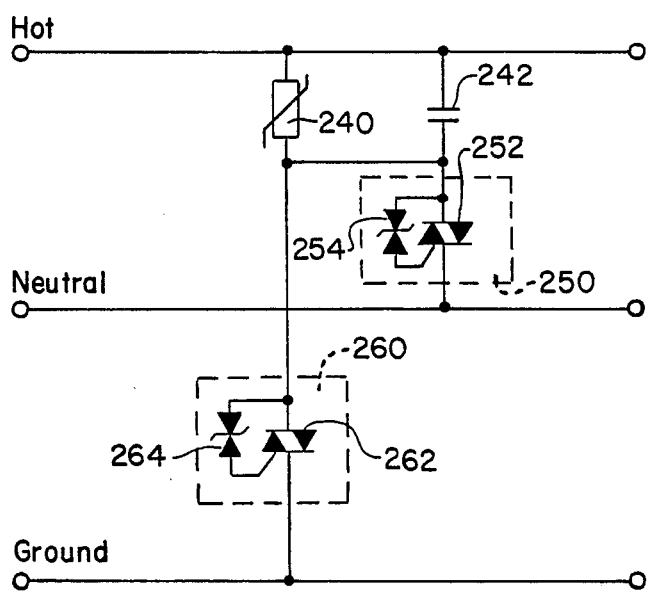
FIG. 6 depicts, in schematic form, an embodiment of the present invention utilizing a crowbar device in the form of a triac with an internal breakdown device.

FIG. 6 depicts an embodiment of the present invention utilizing a crowbar device in the form of a triac with an internal breakdown, or triggering, device, illustratively a device known in the art as a SURGECTOR. Clamping device 240 and trigger device 242 are similar in structure, function and parameters as clamping device 140 and trigger device 142 of FIG. 5. Crowbar device 250 comprises triac 252 and internal breakdown device 254 and protects the hot-to-neutral path from transients. Similarly, crowbar device 260 comprises triac 262 and internal breakdown device 264 and protects the hot-to-ground path from transients.

The device depicted in FIG. 6 operates in a manner similar to the device of FIG. 5, bu provides for more independent protection of the hot-to-neutral path and the hot-to-ground path. More specifically, crowbar device 250 together with clamping device 240 will clamp the hot-to-neutral voltage to a specific level determined essentially by clamping device 240. Similarly, crowbar device 260 together with clamping device 240 will clamp the hot-to-ground voltage to the specific level determined essentially by clamping device 240. Crowbar devices 250, 260 function independently of each other, and activation of one crowbar device will not necessarily require activation of the other crowbar device.

Figure 7:
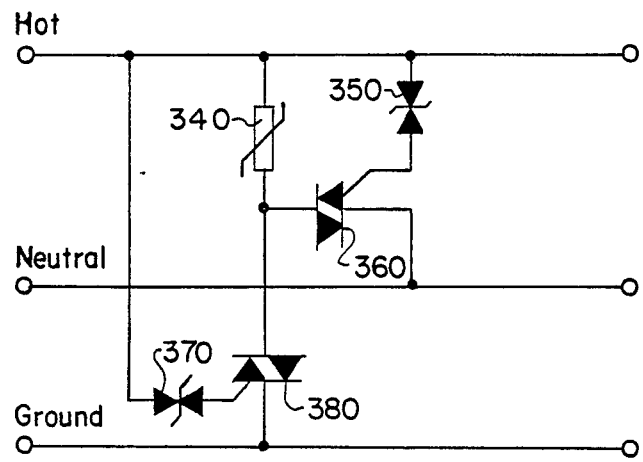
FIG. 7 depicts, in schematic form, an embodiment of the present invention utilizing a crowbar device in the form of a triac with an external trigger device.

FIG. 7 depicts an embodiment utilizing a crowbar device in the form of a triac with an external trigger device, illustratively a bidirectional zener diode (transzorb). Clamping device 340 is similar in structure function and parameters as clamping device 140 of FIG. 5. The crowbar device is in the form of a triac, while the trigger device is in the form of an external bidirectional zener diode or a bidirectional diode-thyristor(diac) with a breakdown voltage of 250V. Alternatively, the crowbar device may be in the form of a silicon controlled rectifier(SCR). Crowbar device 360 and dedicated trigger device 350 protect the hot-to-neutral path from transients. Similarly, crowbar device 380 and dedicated trigger device 370 protect the hot-to-ground path from transients.

The device depicted in FIG. 7 operates in a manner similar to the device of FIG. 6, providing for independent protection of the hot-to-neutral path and the hot-to-ground path. Crowbar device 360 together with clamping device 340 and dedicated trigger device 350 will clap the hot-to-neutral voltage to a specific level determined essentially by clamping device 340.

Similarly, crowbar device 380 together with clamping device 340 and dedicated trigger device 370 will clamp the hot-to- ground voltage to the specific level determined essentially by clamping device 340. Crowbar devices 360, 380 together with corresponding dedicated trigger devices 350, 370 function independently of each other, and activation of one crowbar device will not necessarily require activation of the other crowbar device.

Figure 8:
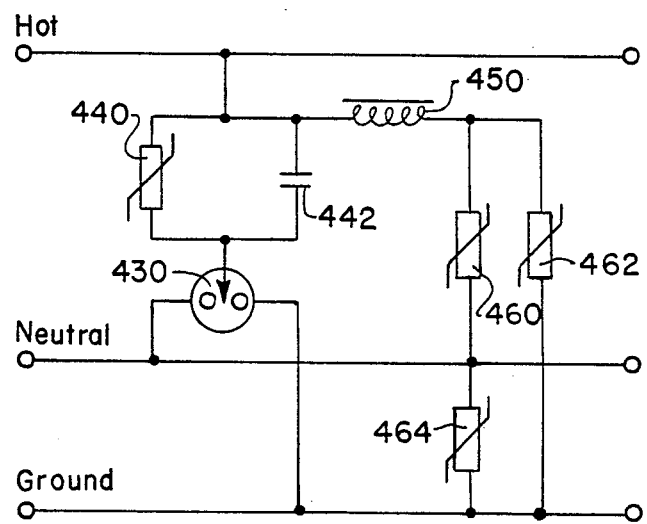
FIG. 8 depicts, in schematic form, an embodiment of the present invention utilizing a crowbar device in the form of a three-electrode gas tube and also a secondary network of three breakdown clamping devices.

FIG. 8 depicts an embodiment utilizing a crowbar device in the form of a three-electrode gas tube and also a secondary backup network of three higher breakdown clamping devices. Three-electrode gas tube 430, clamping device 440 and trigger device 442 are similar in structure, function and parameters as the corresponding elements in FIG. 5, and the circuit comprising such elements also functions in a similar manner.

The secondary backup network comprises inductor 450 and clamping devices 460, 462, 464. Inductor 450 is connected at a first terminal to the hot line of the power supply and at a second terminal to clamping device 460. Clamping device 460 is also connected to the neutral line of the power supply. Clamping device 462 is connected from inductor 450 to ground, while clamping device 464 is connected from the neutral line of the power supply to ground. Clamping devices 460, 462, 464 have clamping voltages higher than that of clamping device 440. Illustratively, clamping devices 460, 462, 464 have clamping voltages of 250VDC at 1 mA and are of the MOV type, while inductor 450 has a value of 5 µH.

The device depicted in FIG. 8 generally functions in the manner of the device of FIG. 5. However, if three-electrode gas tube 430 should vent or similarly malfunction, the secondary network will protect the load from transients in a conventional manner using high voltage MOVs. More specifically, MOV 460 will clamp the hot-to-neutral voltage, MOV 462 will clamp the hot-to-ground voltage and MOV 464 will clamp the neutral to ground voltage. Inductor 450 serves to initially limit the surge current through MOV 460, 462 and/or 464, thus permitting voltage to develop across the primary network of elements 440, 442 and 430.

Figure 9:
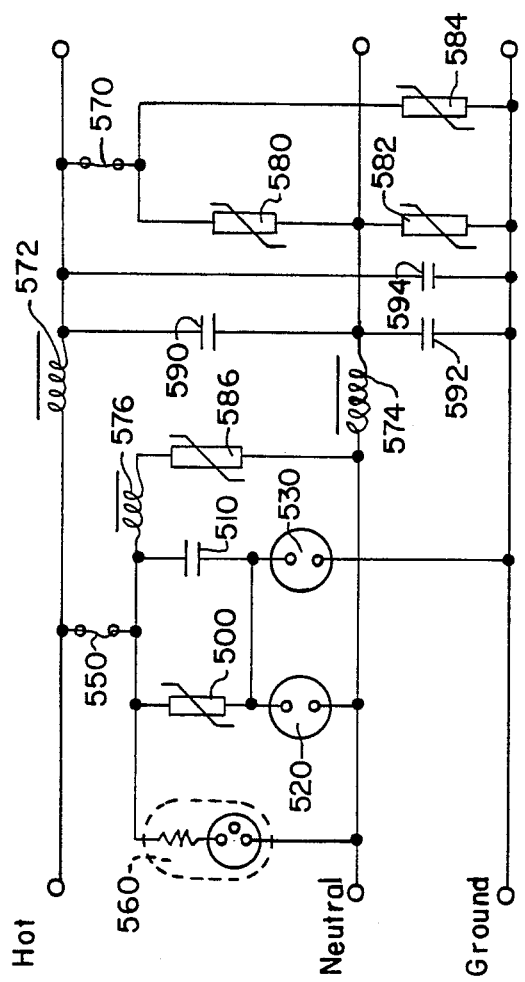
FIG. 9 depicts, in schematic form, an embodiment of the present invention utilizing a plurality of crowbar devices and a plurality of clamping devices.

FIG. 9 depicts an embodiment utilizing a plurality of crowbar and clamping devices, and incorporating a secondary backup network, low pass filtering and a failure indicator. Clamping device 500 and trigger device 510 are similar in structure, function and parameters as clamping device 140 and trigger device 142 of FIG. 5. Crowbar devices 520, 530 illustratively are of the gas tube type. Crowbar device 520, in conjunction with the parallel combination of clamping device 500 and trigger device 510 is utilized to provide surge protection on the hot-to-neutral path. Similarly, crowbar device 530, in conjunction with the parallel combination of clamping device 500 and trigger 510 is utilized to provide surge protection on the hot-to-ground path. Crowbar devices 520,530 function independently of each other and activation of one crowbar device will not necessarily require activation of the other crowbar device.

Fuse 550 and neon lamp 560 are provided to indicate failure of the primary surge protection circuit comprising elements 500, 510, 520, 530. Should an excessive amount of current be drawn by the primary surge protection circuit, fuse 550 will expire thus causing neon lamp 560 to extinguish and thereby providing a visual indication that the primary surge protection circuit is inoperative.

Fuse 570, MOVs 580, 582, 584, 586 and inductors 572, 574, 576 provide surge protection to the hot-to-neutral path, the hot-to-ground path and the neutral-to-ground path if the primary surge protection circuit should fail. Additionally, capacitors 590, 592, 594 and inductors 572, 574 provide low pass filtering to remove initial transients. Illustrative parameters for inductors 572, 574 and 576 are 20 µH, 20 µH and 5 µH, respectively, while MOVs 580, 582, 584, 586 are of the high voltage type so as to permit the operational primary surge protection circuit to function first. Capacitors 590, 592 and 594 illustratively have values of.

Thus it can be seen that there is provided a triggered surge suppression network which provides a low voltage clamp on transient surges which exceed the AC line voltage. The breakdown voltage of the network depends essentially on the breakdown voltage of a crowbar device while the peak voltage available to the load during the surge will depend on the clamping voltage of the clamping device.

In addition, it is to be understood that the invention can be carried out by specifically different equipment and devices and that various modifications, both as to equipment details and operating procedures can be effected without departing from the spirit and scope of the claimed invention. More specifically, although the present invention was described in terms of protection of a 120 VAC supply line, the invention may be practiced with a wide variety of supply voltages, as well as a wide variety of different clamping, crowbar and trigger devices.

What is claimed is:

1. A surge suppression network comprising:
a first circuit consisting of:
a solid state voltage clamping means for clamping a supply voltage to below a specific level upon continued application of a transient surge in excess of a clamping voltage of said clamping means; and
a trigger means electrically connected in parallel to said voltage clamping means; and
a crowbar means for entering a low impedance state upon application of a transient surge in excess of a breakdown voltage of said crowbar means, said crowbar means being serially connected to said first circuit to form a second circuit and said second circuit being electrically connected across a voltage supply, said crowbar means being switched to said low impedance state by said trigger means when a transient surge in excess of said breakdown voltage is applied to said second circuit and said crowbar means and said clamping means clamping said transient surge to a voltage equal to the sum of said clamping voltage and the voltage across said crowbar means in it low impedance state.

2. The surge suppression network of claim 1 wherein said voltage clamping means is a varistor.

3. The surge suppression network of claim 2 wherein said varistor is a Metal Oxide Varistor (MOV).

4. The surge suppression network of claim 1 wherein said voltage clamping means is a high power zener diode.

5. The surge suppression network of claim 1 wherein said crowbar means is a gas tube having a plurality of electrodes.

6. The surge suppression network of claim 5 wherein said plurality is two.

7. The surge suppression network of claim 5 wherein said plurality is three.

8. The surge suppression network of claim 1 wherein said crowbar means is a thyristor.

9. The surge suppression network of claim 1 wherein said crowbar means is a bidirectional triode-thyristor (triac).

10. The surge suppression network of claim 9 wherein said triac is operationally associated with an internal breakdown device.

11. The surge suppression network of claim 1 wherein said crowbar means is a silicon controlled rectifier (SCR).

12. The surge suppression network of claim 1 wherein said trigger means is a capacitor.

13. The surge suppression, network of claim 1 wherein said trigger means includes a bidirectional low power zener diode.

14. The surge suppression network of claim 1 wherein said trigger means includes a bidirectional diode-thyristor (diac).

15. The surge suppression network of claim 1 wherein said clamping voltage is approximately equal to said supply voltage.

16. The surge suppression network of claim 1 wherein said clamping voltage is less than said breakdown voltage.

17. A triggered surge suppression network comprising:
a trigger capacitor;
a varistor having a clamping voltage and connected in parallel to said trigger capacitor;
a gas tube having a breakdown voltage and connected in series with the parallel combination of said capacitor and said varistor;
said network upon application of a transient surge in excess of the breakdown voltage clamping a supply voltage to approximately said clamping voltage, said clamping voltage being less than said breakdown voltage.

18. The surge suppression netwok of claim 17 wherein said clamping voltage is approximately equal to said supply voltage.

* * * * *